C. Learned,
Making Laths.
N° 54,180.    Patented Apr. 24, 1866.
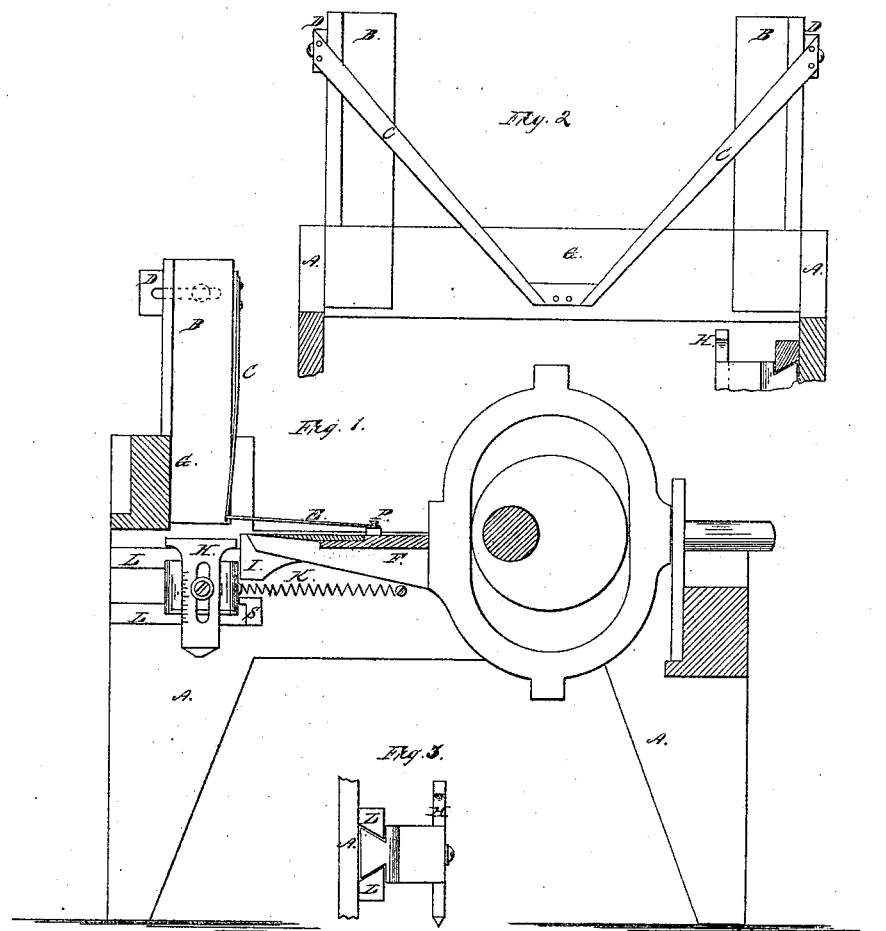
Witnesses    Inventor
G. M. Levelle    Charles Learned
O. F. Mayhew

UNITED STATES PATENT OFFICE.

CHARLES LEARNED, OF INDIANAPOLIS, INDIANA.

IMPROVEMENT IN MACHINES FOR CUTTING LATHS.

Specification forming part of Letters Patent No. 54,180, dated April 24, 1866.

*To all whom it may concern:*

Be it known that I, CHARLES LEARNED, of Indianapolis, in the county of Marion and State of Indiana, have invented new and useful Improvements in Lath-Machines; and I do hereby declare that the following is a full and exact description thereof, reference being had to the accompanying drawings, in which—

Figure 1 is a vertical longitudinal section of a lath-machine. Fig. 2 is a transverse section, giving a rear view of the vertical standards or guides B and flexible guides C, for holding the board from which the laths are cut perpendicular in the vertical standards. Fig. 3 is an end view of one of the reciprocating rests H, upon which the lower edge of the board rests.

Similar letters of reference indicate corresponding parts in the several figures.

My invention relates to an improvement in that class of lath-machines in which the laths are cut by a reciprocating knife from boards sawed the proper length and thickness, placed in vertical grooved standards, and resting on guides or rests that reciprocate with the knife, and so arranged that the board is fed to the knife by its own gravity, dropping down upon the reciprocating rests as the laths are cut from it, as described in the patent granted to John L. Brown, January 15, 1856, my improvement consisting in attaching adjustable flexible guides to the vertical standards so arranged as to hold the board perpendicular in the vertical guides, that it may always drop down vertically upon the reciprocating guides or rests, and the laths be cut with square edges, the flexible guides being especially serviceable when the board is reduced to a narrow piece, or when narrow pieces of board are used, so that any piece of board that will make a few laths may be readily worked up in the machine. The flexible guides are also made adjustable to the vertical standards or guides, so as to receive boards of any desired thickness.

A further improvement consists in arranging the reciprocating guides or rests that support the boards from which the laths are cut in slides on the inside of the frame and disconnected from the reciprocating knife-frame, instead of attached thereto, as in Brown's machine, before mentioned, and which are pushed from under the board by means of bumpers on the knife-frame, being returned to their position under the board by means of springs, stops being provided to arrest the backward movement of the rest just before the edge of the knife is withdrawn from under the board, the rests having no farther backward movement after the board drops upon them, thus avoiding the tendency to tip the board by the backward movement of the rests, and especially when the board is reduced to a narrow piece.

To enable others skilled in the art to make and use my invention, I will proceed to describe it.

Fig. 1 is a section view of the machine, substantially as shown and described in Brown's patent, before mentioned; but it is here shown as usually constructed, with only one knife, A being the frame; F, the reciprocating knife-frame; G, the cutting-bar; H, the reciprocating rests, and B the vertical standards or guides in which the board is placed from which the laths are cut; but instead of making the vertical standards B in one piece, with a groove to receive the board, as in that machine, I rabbet them, as shown in Figs. 1 and 2, and attach to them the flexible guides C by means of the slotted slides D, secured to the standards by a screw through the slot in the slide, as shown, by which arrangement the space to receive the board may be increased or diminished at pleasure, to adapt it to planks of different thickness. The flexible guides C are set at an angle approaching each other at the bottom, and are connected together as shown in Fig. 2. They should extend as near as practicable to the bottom of the board, and serve to keep it perpendicular in the standards and against the cutting-bar G, being curved a little toward the board, so as to press slightly against it.

A wire loop or link, E, is attached to the piece connecting the flexible guides at the bottom, which is looped over a pin, P, in the reciprocating knife-frame, and is so arranged that the flexible guides are drawn back at the end of the backward stroke of the knife just enough to relieve the pressure on the board and allow it to drop down upon the reciprocating rests H. This manner of keeping the plank perpendicular in the standards B, and relieving it of the pressure of the flexible guides at the proper time to allow it to drop down upon the rests H while they are at rest, prevents the board, when cut down to a narrow strip, from being tipped on one side and cut up into irregular pieces, as is frequently the case in other machines, and enables me to work up narrow pieces of board to a good advantage; and I am also enabled to place narrow pieces of board in the machine more conveniently, so that both ends will drop down upon the rests H at the same time, while in the machine of Brown the boards could only be dropped in haphazard, many times one end going down first, and thus spoiling the lath; and, also, instead of attaching the reciprocating rests H to the knife-frame, as in Brown's machine, I attach them to the frame A in dovetailed slides L L, as shown, the bumpers I on the knife-frame driving the rests from under the board as the knife cuts through it, and the springs K drawing them back under the board as the knife is drawn back. A stop, S, arrests the backward movement of the rest H just as the knife is drawn from under the board, which then drops down upon the rests, being held perpendicular in the standards B and against the cutting-bar G by the flexible guides C. I arrange and operate the reciprocating rests H in this manner to avoid drawing the bottom of the board backward by the backward movement of the rests after the board drops upon them, as in Brown's machine, as when the board is reduced to a narrow piece, or when narrow pieces are placed in the machine, if the rest moves back with the knife the tendency is to tip the board on edge, and so cut the last few laths irregularly or entirely spoil them.

I do not make any claim to cutting laths by means of a reciprocating knife, as this is old, nor to vertical guides for feeding the board to the knife by its own gravity, nor to horizontally-reciprocating rests to catch the board as it descends and hold it in proper relation to the knife that the laths may be cut the proper thickness; but What I do claim as new, and desire to secure by Letters Patent, is—

1. The adjustable flexible guides C and loop E, arranged and operated in the manner and for the purpose substantially as set forth.

2. Operating the reciprocating rests H in the manner and for the purpose substantially as set forth.

CHARLES LEARNED.

Witnesses:
G. M. LEVETTE,
O. F. MAYHEW.